E. H. OVERSMITH.
FRONT AXLE DRIVE MECHANISM.
APPLICATION FILED FEB. 16, 1917.
1,252,609.
Patented Jan. 8, 1918.
2 SHEETS—SHEET 1.
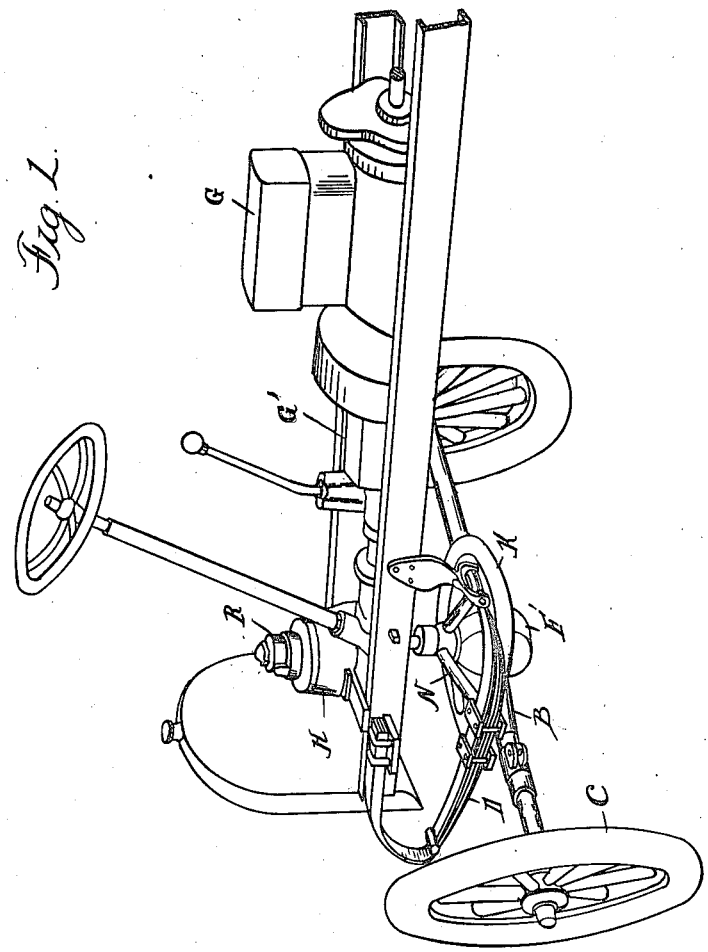
Inventor
Elmer H. Oversmith

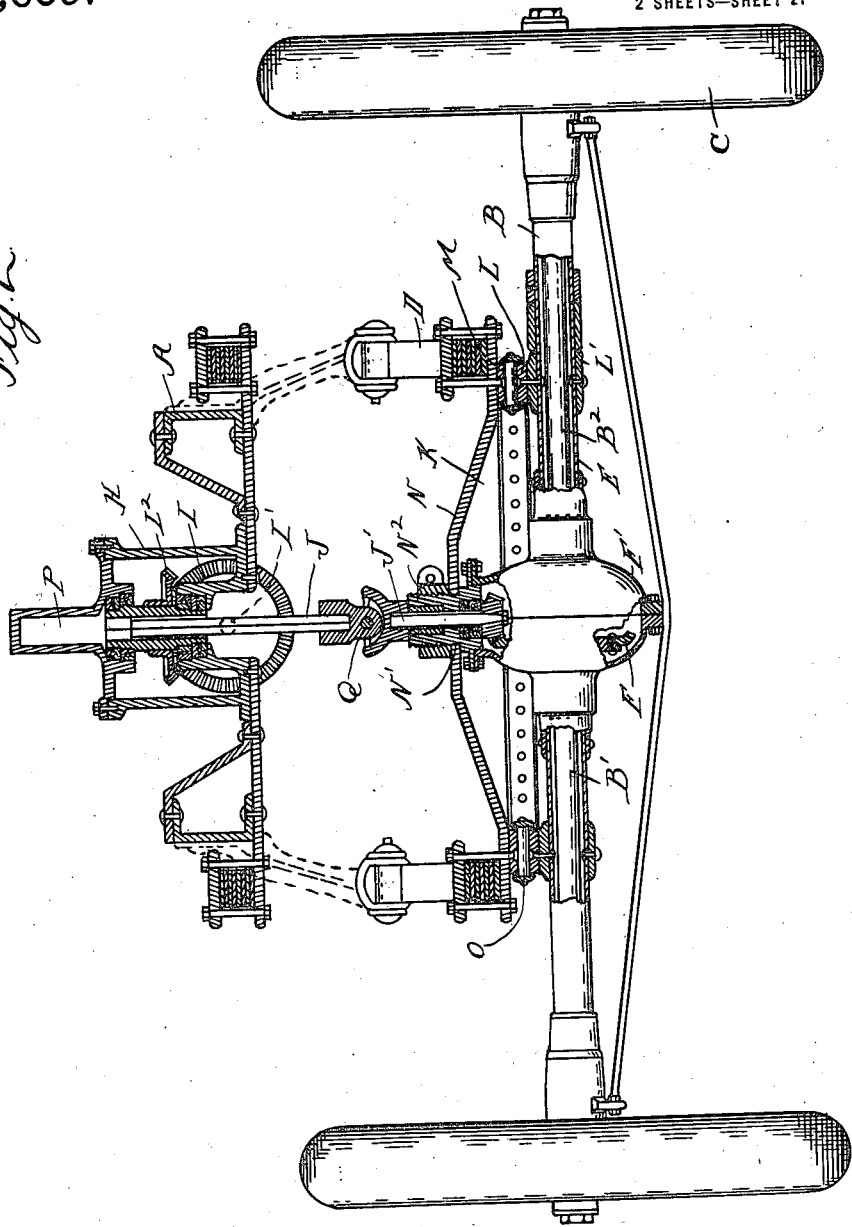

UNITED STATES PATENT OFFICE.

ELMER H. OVERSMITH, OF JONESVILLE, MICHIGAN, ASSIGNOR, BY MESNE ASSIGN-
MENTS, TO BRAZIL MOTORS COMPANY, OF BRAZIL, INDIANA, A CORPORATION OF
INDIANA.

FRONT-AXLE DRIVE MECHANISM.

1,252,609.

Specification of Letters Patent.  Patented Jan. 8, 1918.

Application filed February 16, 1917. Serial No. 149,112.

*To all whom it may concern:*

Be it known that I, ELMER H. OVERSMITH, a citizen of the United States of America, residing at Jonesville, in the county of Hillsdale and State of Michigan, have invented certain new and useful Improvements in Front-Axle Drive Mechanism, of which the following is a specification, reference being had therein to the accompanying drawings.

The invention relates to drive mechanism for the front axle of a motor vehicle and the object of the invention is to obtain a construction which will drive the front axle, and which will permit of the vertical and lateral or tilting movements of the frame relative to the axle, due to the action of the springs therebetween. Another object of the invention is to secure a construction which will permit of the steering of the vehicle through the front axle and be unaffected thereby. Still another object of the invention is to secure a construction which is simple and efficient in operation. Further objects of the invention will more fully hereinafter appear.

In the drawings:

Figure 1 is a perspective view of the construction embodying my invention; and

Fig. 2 is a sectional view thereof.

A represents the frame of the motor vehicle, B the front axle, C the wheels upon the axle and D the springs yieldably supporting the frame upon the axle. The front axle B comprises the shaft members B' and B² in axial alinement and within the housing E, said shaft members being connected to the wheels C and the differential gearing F inclosed within its housing F', which is suitably connected to the housing E.

Mounted upon the frame A is the engine G and the change gear transmission G' adapted to be operated in the usual manner by the driver. The driving shaft extending from the change gear transmission and the driving shaft for the differential gearing extend respectively substantially horizontally and substantially vertically. For the purpose of driving the latter shaft from the former there is provided the gear box H vertically mounted upon the frame A and inclosing the drive gear I, mounted upon the shaft I', which extends from the change gear transmission, and the driven gear I² meshing with the drive gear I and extending transversely thereof. Nonrotatably engaging the driven gear I² is the shaft J extending substantially vertically and connected to the driving shaft J' of the differential gearing. As shown the shaft J is polygonal but it is evident that a key might be used.

For the purpose of permitting of the steering, the front axle B is provided with the fifth wheel K, comprising the circle bar L secured to the housing E by means of the clips L' and the complementary circle bar M upon which is mounted the cross bar N extending diametrically thereof and secured thereto, the cross bar being provided with the central aperture N' for engaging the differential gearing housing F'. The nut N² upon the housing F' retains the cross bar N in position, thereby locating the fifth wheel K with respect to the axle. At opposite ends the cross bar N supports the springs D which are securely clamped thereto.

Preferably interposed between the complementary circle bars L and M is some anti-friction device such as the roller bearings O. Although the member N is described as a cross-bar it is evident that the same may have radially-extending arms and be in effect a spider.

In order to permit of the vertical movement of the frame A relative to the front axle B the gear box H is provided with the hollow vertical extension P for permitting of the longitudinal sliding of the shaft J therein through the gear I². For permitting of the lateral movement or of the tilting of the frame relative to the front axle the universal joint Q is employed to connect the shaft J to the driving shaft J' of the differential gearing.

What I claim as my invention is:

1. The combination with a frame, of a front axle, springs yieldably supporting said frame upon said axle, a drive shaft upon said frame and a longitudinally movable driven shaft upon said axle, a gear box, and gears connected to said drive and driven shafts inclosed within said gear box, said gear box being provided with an extension for permitting of the longitudinal movement of said driven shaft.

2. The combination with a frame, of a drive axle, means for yieldably supporting said frame upon said axle, a gear box containing a drive gear mounted upon said frame, differential gearing mounted upon said axle, and driving connections between said drive gear and differential gearing longitudinally slidably engaging said gear box.

3. The combination with a frame, of a drive axle, springs yieldably supporting said frame upon said axle, a drive shaft upon said frame, a gear box mounted upon said frame provided with an extension, intermeshing gears within said gear box driven by said drive shaft, and driving connections between one of said gears and said drive shaft slidably engaging said one gear and said gear box extension.

4. The combination with a frame, of a drive axle, springs yieldably supporting said frame upon said axle, differential gearing upon said axle, a drive shaft and a gear box upon said frame provided with an extension, intermeshing gears within said gear box, one of which is connected to said drive shaft, a depending shaft longitudinally slidably engaging the other gear and said gear box extension, and a shaft having a universal joint connection with said depending shaft and having a driving engagement with said differential gearing.

In testimony whereof I affix my signature.

ELMER H. OVERSMITH.